(No Model.) 2 Sheets—Sheet 1.
A. M. REEVES.
BABY CARRIAGE.
No. 478,172. Patented July 5, 1892.
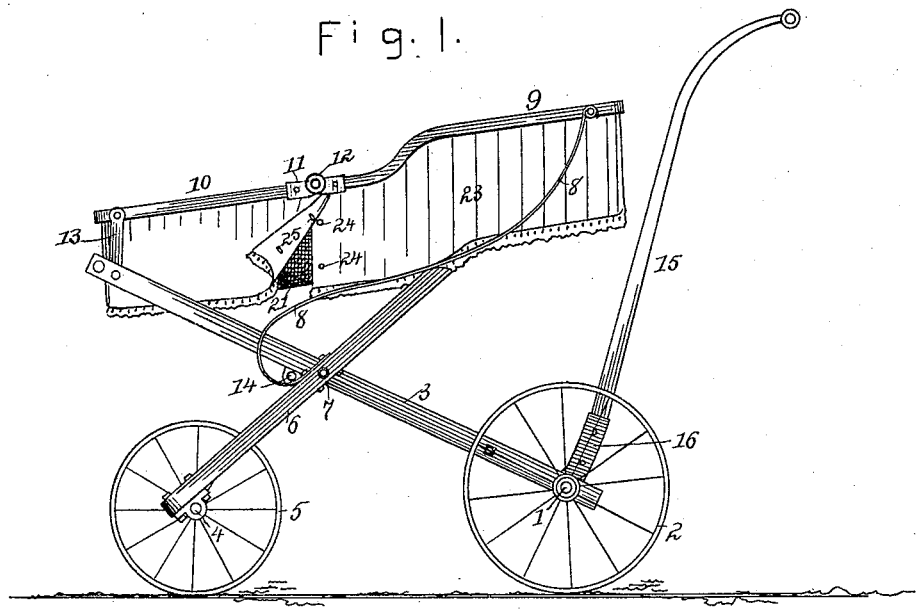
Fig. 1.
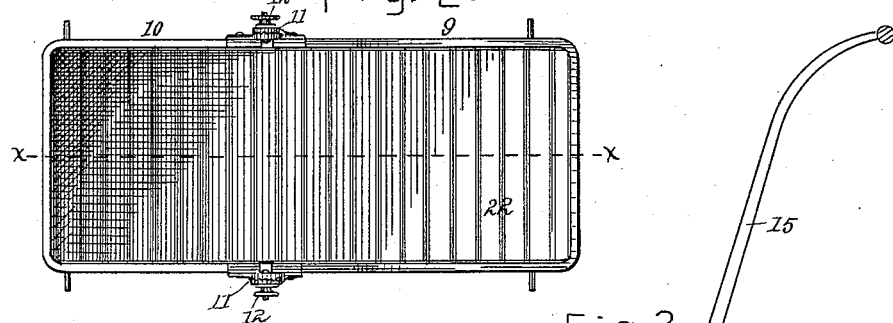
Fig. 2.
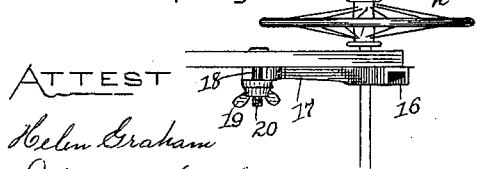
Fig. 4.
Fig. 3.
ATTEST
Helen Graham
William Graham
INVENTOR
Abbott M. Reeves
by his attorney
L. P. Graham (No Model.)  2 Sheets—Sheet 2.
A. M. REEVES
BABY CARRIAGE.
No. 478,172.  Patented July 5, 1892.
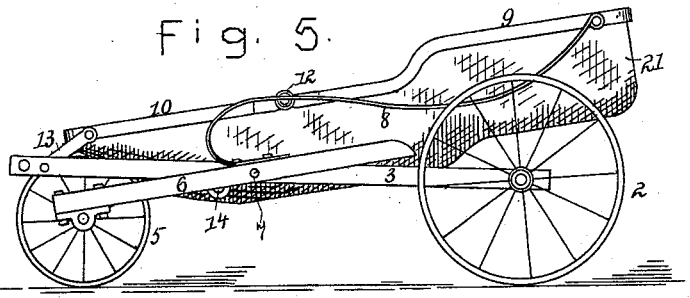
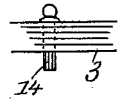
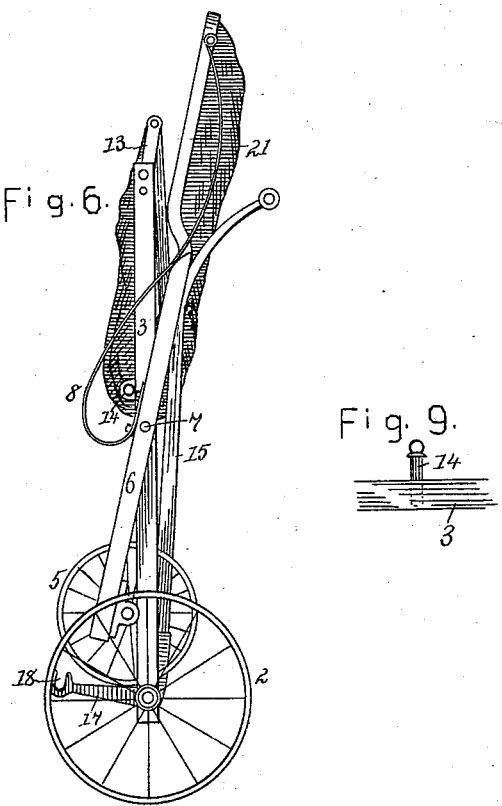
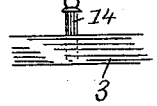
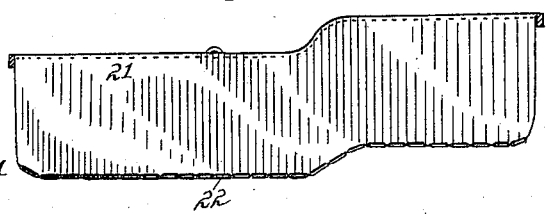
ATTEST.
Helen Graham
William Graham
INVENTOR
Abbott M. Reeves.
by his attorney
L. P. Graham
THE NORRIS PETERS CO., PHOTO-LITHO., WASHINGTON, D. C.

UNITED STATES PATENT OFFICE.

ABBOTT M. REEVES, OF DECATUR, ILLINOIS.

BABY-CARRIAGE.

SPECIFICATION forming part of Letters Patent No. 478,172, dated July 5, 1892.

Application filed March 14, 1892. Serial No. 424,905. (No model.)

*To all whom it may concern:*

Be it known that I, ABBOTT M. REEVES, of Decatur, in the county of Macon and State of Illinois, have invented certain new and useful Improvements in Folding Baby-Carriages, of which the following is a specification.

This invention relates to folding baby-carriages in which the camp-stool principle is utilized. Its object is to improve such carriages in various details; and it consists in the details of construction and combinations of parts hereinafter set forth and claimed.

In the drawings accompanying and forming a part of this specification, Figure 1 is a side elevation of a carriage embodying my improvements. Fig. 2 is a plan of the bed. Fig. 3 is a fragment of the wheel-frame, showing the device used to hold the handles rigid. Fig. 4 is a plan of the details set forth in Fig. 3. Fig. 5 represents a carriage with the handles removed and the frames folded down preparatory to shipping. Fig. 6 shows the carriage folded to carry. Fig. 7 is a section through the bed on line X in Fig. 2. Figs. 8 and 9 are details showing the operation of the stop used to lock the wheel-frames in position for use while permitting them to be folded down for shipping.

The rear axle 1 has wheels 2 outside the frames. The bars 3 are mounted on axle 1. They extend forward from such axle and are connected at their forward ends by means of a cross-bar *a* and also carry upwardly-extending links 13, pivoted near the cross-bar. Front axle 4 is provided with wheels 5 inside the frame bars. The bars 6 are mounted on the front axle and are connected pivotally at 7 with bars 3 and also provided with springs, as 8. The bed-frame is made up of two parts 9 and 10, pivoted together at 11. The faces of the pivot-joint are radially corrugated, as indicated in Fig. 2, and nuts 12 on the pivot-bolt provide means for locking the corrugated faces together. Bolts 14 are secured to bars 3 above the pivot 7, and they bear against the upper surfaces of bars 6 to lock the carriage in the position shown in Fig. 1. They are preferably withdrawable, as shown in Figs. 8 and 9, to permit the carriage to be folded, as shown in Fig. 5. The handles 15 are held in brackets 16. The brackets are pivoted on the rear axle adjacent to the side bars, and they each have an arm 17, carrying a slotted head 18. Bolts 20 extend through the side bars in line with the slots, and nuts 19 provide for clamping the heads in rigid contact with the side bars. The bed 21 is made of flexible fabric, and its bottom is articulated longitudinally and stiffened transversely with stays or ribs, as indicated in Figs. 2 and 7. It may be trimmed with ornamental drapery or hangings, as indicated somewhat crudely in Fig. 1 at 23, and such hangings, if stiff, may be lapped and buttoned or otherwise detachably secured together in line with the pivots of the bed-frame, as seen in Fig. 1, where 24 represents buttons, and 25 button-holes, and the flap is turned back on one side to better show the construction. The bed-frame connects pivotally at its front end with links 13 and at its rear end with springs 8.

The carriage, as seen in Fig. 1 is, except for the disarranged flap of the hangings, in operative condition. The bed is sustained yieldingly at its rear end by the springs, and its front end rocks on the links as the spring vibrates. The stop 14 sustains the wheel-frame in its shown position, and the handles are held rigid with the frame by the bolts 20 and nuts 19. When it is desired to fold the carriage for carrying, the nuts 12 are loosened to permit the bed-frame to hinge freely, the hangings, if any, are loosened, as shown, the nuts 20 are loosened to permit the handles to swing, and the device is folded, as seen in Fig. 6. To fold for shipping, the stop-bolts 14 are withdrawn, as shown in Fig. 9, permitting the frames to assume the condition shown in Fig. 5, and the handles are detached. The form of the springs and their points of connection with the bars 6 are matters governed by circumstances and depending on the comparative degree of strength and elasticity desired in any given case.

In the drawings but one bar of each wheel-frame and one handle are shown. It will be understood, however, that such bars and handle are constructed in duplicate and arranged oppositely with relation to the bed.

The bed-frame is preferably made of wood bent to shape, and in such case the bed fabric is tacked to the frame. The frame may also be made of metal, if desired, and the bed be secured thereto by clasps or other desirable connections.

I claim—

1. The combination, in a baby-carriage composed of cross-frames pivotally connected and provided each with wheels, of a rigid rear-wheel frame, a front-wheel frame elastic at its upper end, and a bed connected at its front end with the rear-wheel frame and at its rear end with the front-wheel frame.

2. The combination, in a baby-carriage composed of cross-frames pivotally connected and provided each with wheels, of a rigid rear-wheel frame, a front-wheel frame elastic at its upper end, and a bed connected directly with one frame and connected with the other frame by means of approximately vertical links.

3. The combination, in a baby-carriage composed of cross-frames pivotally connected and provided each with wheels, of a rigid rear-wheel frame having links at its upper end, a front-wheel frame having springs at its upper end, and a bed supported at its forward end on the links and at its rear end on the springs.

4. In a folding baby-carriage, the combination of axle 1, bars 3, mounted on the axle, handles 15, handle-brackets 16, having arms 17, provided with slotted heads, bolts 20, adapted to extend through the bars and the slots of the heads, and the nuts 19 to hold the heads in rigid contact with the bars.

5. In a folding baby-carriage, the combination, with the frame and the rear axle thereof, of handles connected pivotally with the axle and having extensions detachably secured to the frame.

6. In folding baby-carriages, the combination, with a jointed frame and a flexible bed, of comparatively stiff hangings parted at the joints of the frame and detachably connected.

In testimony whereof I sign my name in the presence of two subscribing witnesses.

ABBOTT M. REEVES.

Attest:
L. P. GRAHAM,
PARKE HAMMER.